J. J. DONNELLY.
PIPE TURNING MECHANISM.
APPLICATION FILED JULY 26, 1917.

1,258,662.

Patented Mar. 12, 1918.
2 SHEETS—SHEET 2.

WITNESSES

INVENTOR
J. J. Donnelly

UNITED STATES PATENT OFFICE.

JOSEPH J. DONNELLY, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

PIPE-TURNING MECHANISM.

1,258,662.     Specification of Letters Patent.     Patented Mar. 12, 1918.

Application filed July 26, 1917. Serial No. 182,908.

*To all whom it may concern:*

Be it known that I, JOSEPH J. DONNELLY, a citizen of the United States, and resident of Pittsburgh, in the county of Allegheny and State of Pennsylvania, have invented certain new and useful Improvements in Pipe-Turning Mechanisms, of which the following is a specification.

My invention relates to apparatus used in handling and conveying welded pipes and tubes of polygonal cross section, such as octagonal, hexagonal or square while being cooled from the highly heated condition in which such materials are found at the completion of the welding operation. The invention more particularly relates to apparatus for handling and conveying pipes and tubes of square or rectangular cross section while the pipes or tubes are being cooled after the welding operation.

In making wrought metal pipes and tubes, the welding operation, and when the pipes or tubes are sized, the sizing operation, is completed at a high temperature, as is well known. The welded pipes and tubes are then transferred to a cooling bed or table on which they are supported while being cooled or reduced in temperature to the point where they can be handled manually or can be threaded or otherwise treated mechanically.

The pipes or tubes are received at one side of the series of skids or supports forming the cooling bed and are conveyed transversely from end to end of the skids forming the cooling bed, generally being discharged from the cooling bed into cradles, which are arranged to receive and hold a considerable quantity or number of the cooled pipes and tubes. When sufficient pipes or tubes are collected in the cradles, they are removed in quantities, chain slings suspended from the trolley hook of an overhead traveling crane and passed around the pipes and tubes, being employed in transferring the bundle of pipes or tubes from the cradles to a place of storage or use.

Being highly heated when received on the cooling table and although supported at short intervals in their length by the skids, the pipes and tubes will sag by their own weight between the supporting skids, unless they are rotated while traversing the cooling table. Cylindrical pipes and tubes will constantly roll or rotate on the skids in traversing the cooling table, but owing to their flat sides, pipes or tubes of rectangular or polygonal cross section do not automatically turn like the cylindrical pipes but slide across the width of the cooling table, and as a result such flat sided pipes and tubes will not be straight but will be found to have kinks and short bends formed therein.

One object of my invention is to provide improved means for automatically turning or rotating pipes and tubes of rectangular cross section as such pipes and tubes are cooling and are being conveyed from one side to the other of a cooling table.

Another object of this invention is the provision on a cooling table or "hot bed" of a pipe turning mechanism having the novel construction, arrangement, and combination of parts shown in the drawings, to be described in detail hereinafter, and to be specifically pointed out in the appended claims.

Referring now to the drawings, forming part of this specification, Figure 1 is a plan showing a cooling table or bed adapted for use in cooling cylindrical pipes and having a pipe turning mechanism constructed and arranged and applied for use thereon in accordance with my invention.

Figure 1:
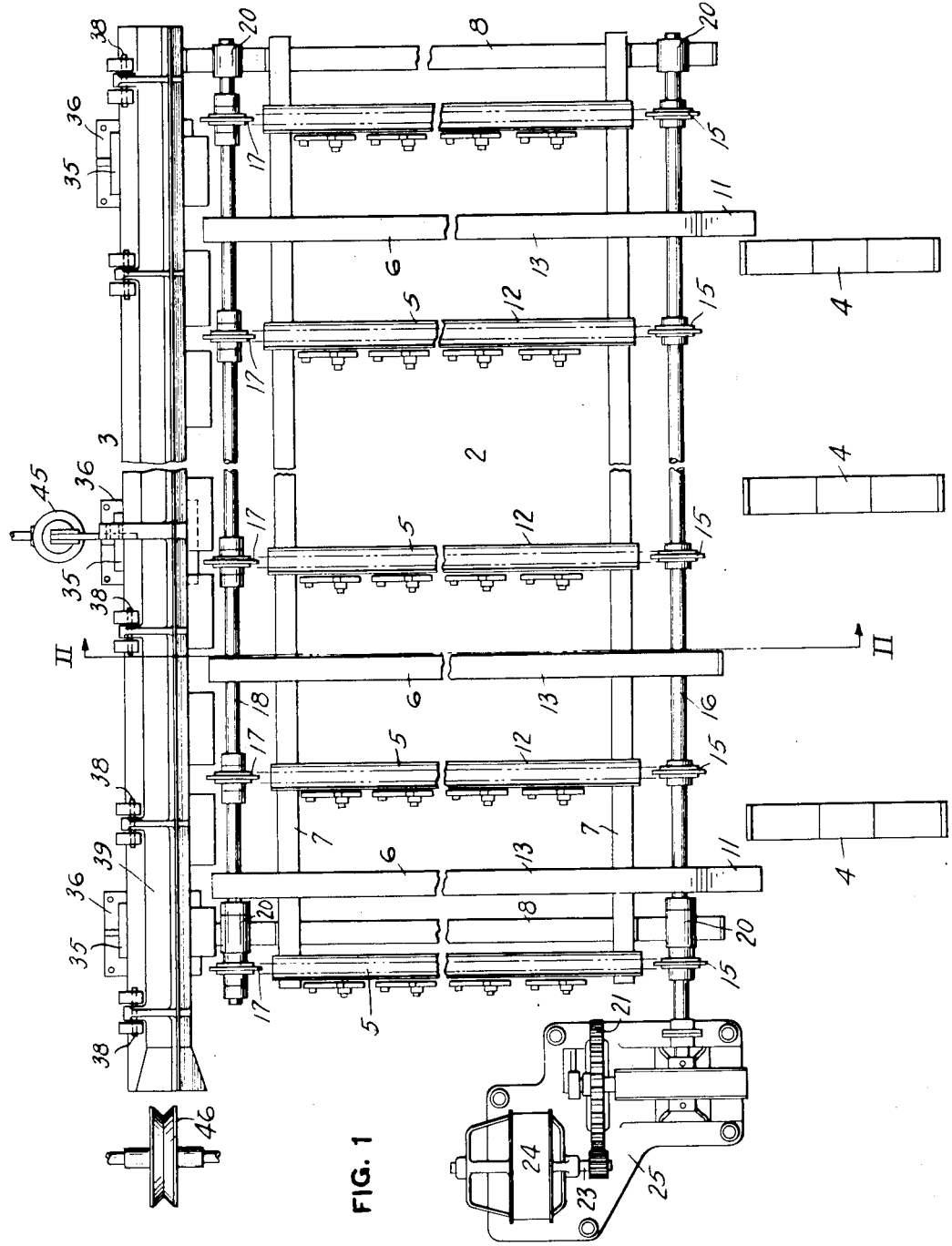

In the accompanying drawings, the numeral 2 designates generally a cooling table or bed having a pipe and tube turning mechanism thereon embodying my invention.

Extending along one side of the cooling table is a trough forming a runway 3 on which the pipes or tubes are delivered lengthwise alongside the cooling table into position to be discharged transversely, by gravity, upon the cooling table 2.

Located opposite the other side of the cooling table is a series of cradles 4, into which the cooled pipes or tubes are discharged by gravity from the cooling bed or cooling table 2 and in which the cooled pipes or tubes are collected until a quantity has been assembled therein.

Preferably the skids 5 and 6 of the cooling table 2, upon which the pipes or tubes are supported while cooling and while traversing the width of the cooling table, are inclined upwardly toward the discharge side of the cooling table, this construction enabling the pipes and tubes to be delivered transversely by gravity from the runway 3 to the receiving side of the cooling table 2 and from the opposite or discharge side of the cooling table into the cradles 4.

The series of inclined, lengthwise parallel skids 5 and 6 are mounted upon the beams 7, 7, which in turn are supported upon cross beams 8 and the cross beams 8 are fastened at their ends and, when required, at suitable intervals in the length of the cross beams to the upper ends of columns 9. The columns 9 are secured on a suitable foundation.

Figure 2:
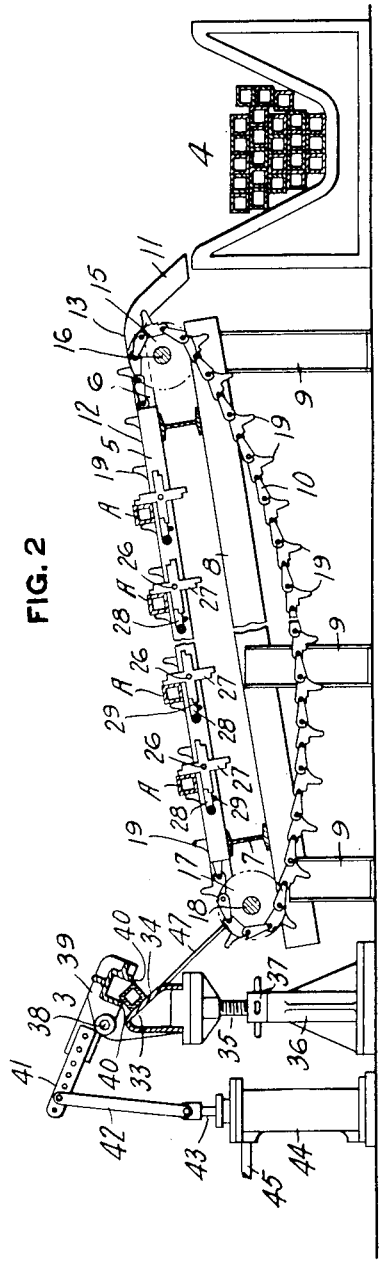
Fig. 2 is a sectional end elevation of the same, the section being taken on the line II—II of Fig. 1.

The skids 5 are made trough shaped in cross section, as shown, to provide suitable channels or slideways for the endless sprocket chains 10 which are used in moving the pipes and tubes across the width of the cooling table, on the inclined upper surfaces of the skids 5 and 6 on which the pipes and tubes are supported. The skids 6 have one end thereof bent outwardly and downwardly, the bent ends 11 of these skids terminating in a plane at one side of the cradles 4 adjacent to the upper end of the cradles. (See Fig. 2.).

The upper edges 12 of the sides of the trough shaped skids 5 and the upper surfaces 13 of the skids 6 are in the same inclined plane.

The endless sprocket chains 10 extend around pairs of sprocket wheels, 15, 17, one wheel 15 of each pair being keyed or otherwise fastened on the chain driving shaft 16 and the other sprocket wheel 17 of each pair being mounted on the idler shaft 18.

Alternate links in the sprocket chains 10 are provided with fingers 19 which project outwardly from one side of the links so as to extend upwardly above the upper edges or surfaces of the skids 5. These fingers 19, engage with and positively move the pipes across the width of the cooling table and maintain the pipes or tubes in parallel spaced relation on the cooling table so as to insure a free circulation of air under and around the heated pipes and tubes and in this way assist in cooling the pipes.

The shafts 16 and 18 are rotatably mounted in pairs of bearings 20, 20, and these bearings are secured on the upper flanges of the cross beams 8, forming part of the cooling table frame. The chain driving shaft 16 is connected by suitable reducing gear 21 to the armature shaft 23 of a driving motor 24, this motor and the reducing gearing being mounted upon a base 25 at one end of the cooling table 2. (See Fig. 1.).

Pivotally mounted on one side of each skid 5, at suitably spaced intervals in the length of the skids, by means of axially horizontal pivot pins 26 is a series of star wheels 27, each of these wheels having four radial arms, as shown. The wheels 27 are pivoted on the side of the skids 5 in rows so as to project above the upper edge of the skids and cause the wheels in each row to engage with the pipes and tubes as the pipes or tubes are moved toward the discharge side of the cooling table 2 by the fingers 19 of the sprocket chains 10.

Figure 3:
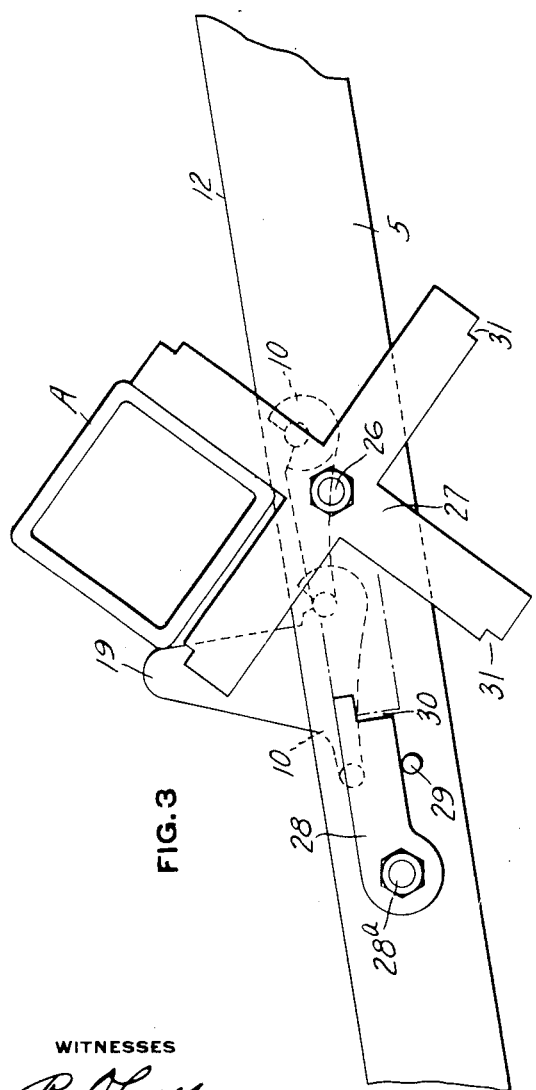
Fig. 3 is a plan, on a larger scale, showing details in the construction and arrangement of a turning mechanism embodying my invention.

The rows or sets of star wheels 27 are caused to turn or revolve through a part of a revolution (approximately 90 degrees) when a pipe or tube of square or polygonal cross section is brought into engagement with one of the arms and the arms by engagement with the flat sided pipe or tube, cause it to rotate or turn through an angle of 90 degrees, (see Fig. 3,) in this way changing the side of the pipe in contact with the skids 5 and 6, avoiding uneven cooling and preventing bending or sagging of the heated pipes and tubes while they are supported on the cooling table.

As the star wheels 27 are loosely mounted on the pivot pins 26, a pawl or counterweight 28 is provided for each wheel 27, these pawls being pivoted by pins 28ᵃ at one end to the side of a skid 5. Pins 29 in the side of the skids 5 form stops which engage with and limit the swinging movement of the pawls 28 in one direction.

The swinging ends of the pawls 28 are provided with a notch 30 which engages with a similarly shaped notch 31 in the outer or swinging end of each arm of the star wheels 27, the pawls 28 acting to automatically maintain the star wheels in proper position for turning engagement thereof with the pipes or tubes. (See Fig. 3.).

The trough or runway 3 has a long narrow apron plate 33 whose upper surface 34 is inclined transversely, (see Fig. 2) and which is supported upon the upper ends of vertically extending posts 35. The lower ends of the posts 35, which are screw threaded, extend downwardly into hollow pedestals or bases 36, the nuts 37 on the screw threaded ends of the posts engaging with the upper ends of the pedestals 36 to secure the vertically adjustable apron plate 33 in adjusted position on the pedestals.

Pivotally mounted on the apron plate 33 by hinge pins 38 is a trough like cover 39 for the apron plate. This hinged or pivoted cover is substantially an inverted U-shape in cross section, having three closed sides and one lowermost open side. (See Fig. 2.) The marginal edges 40, 40, of two of the sides of the cover 39 are arranged to engage with the inclined face 34 of the apron plate 33 when the cover is moved from its open position or that shown in full lines in Fig. 2 into pipe receiving position. When in such closed or pipe receiving position the trough like cover 39 co-acts with the upper, transversely inclined surface 34 of the apron plate 33 to form a passage for the pipes or tubes, which is rectangular in cross section.

The tilting cover 39 may be operated by hand. As shown it is provided with an arm 41 pivotally connected by links 42 to the projecting end of a piston rod 43 for the piston in the fluid pressure cylinder 44 by which the cover is moved and held in open position. The weight of the cover 39 is sufficient to overbalance that of the piston rod 16 and piston on its lower end so that when the supply of fluid pressure is shut off from the cylinder and the pipe 45 leading into the upper end of the cylinder 44 is opened to the atmosphere the cover 39 will swing downwardly into closed position and remain in such position until again moved into open position by the operating cylinder.

The receiving end of the trough 3 is flared outwardly and is positioned in line with and adjacent to the end one of a series of grooved feed-rollers 46 on which the pipes and tubes are delivered lengthwise into the flared receiving end of the runway.

Inclined bars 47 extending from the inclined face 34 of the apron plate on the trough 3 to the receiving end of the cooling table serve to deliver the pipes and tubes as discharged from the trough to the cooling table 2 in position to be engaged by the sprocket chains.

In the operation of cooling tables equipped with my improved pipe turning mechanism the pipes A while still highly heated are transferred lengthwise upon the grooved rollers 46 into the closed runway 3 opposite one side of the cooling table 2.

An operator then turns a three-way valve on the pipe 45 to admit fluid pressure to the upper end of the vertical cylinder 44. The fluid pressure moves the piston and piston rod 43 downwardly within the cylinder and causes the swinging cover 39 to move from its closed position into open position (or that shown in full lines in Fig. 2). When so lifted the pipe A on the runway 3 is released and slides downwardly upon the inclined surface 34 of the trough and inclined bars 47 onto the skids 5 and 6 on the receiving side of the cooling table 3.

The series of endless chains 10 which ordinarily are continuously operated by the motor 24 move one of the sets of fingers 19 on alternate links of the chain 10 into engagement with the pipe A and the pipe is thereupon caused to move transversely across the width of the cooling table 2. When the moving pipe comes into engagement with an arm of the sets of star wheels 27 pivotally secured on the skids 5 such pipe is caused to turn or rotate through an angle of 90 degrees. When the pipe comes into engagement with an arm of the star wheels 27 in the next or second set, turning of the pipe through an angle of 90 degrees is again effected by such set of star wheels and a third side of the pipe is thereby brought into supporting engagement with the skids of the cooling table.

The above described operations are then repeated with the third and fourth sets of star wheels 27 comprising the particular turning mechanism shown and upon further travel of the pipe on the cooling table 2, it finally reaches the inclined end 11 of the skids 6 and is discharged thereon by gravity into the cradles 4.

The advantages of my invention will be apparent to those skilled in the art. Modifications in the construction and ararngement of the turning mechanism may be made without departing from my invention as defined in the appended claims.

I claim:—

1. The combination with means for supporting heated pipes and means for moving the pipes, of a pipe turning mechanism located in the path of movement of the pipes and arranged to engage with and turn successive pipes brought into engagement therewith by said pipe moving means.

2. The combination with a pipe cooling table having means for supporting heated pipes traversing the width of the cooling table, and means for moving the pipes, of a pipe turning mechanism located in the path of movement of the pipes and arranged to turn through part of a revolution, successive pipes brought into engagement therewith by said pipe moving means.

3. The combination with a pipe cooling table having means for supporting heated pipes traversing the width of the cooling table, and means for moving the pipes, of a pipe turning mechanism located in the path of movement of the pipes and arranged to turn through part of a revolution, successive pipes brought into engagement therewith by said pipe moving means, and means engaging with said pipe turning mechanism arranged to yieldingly hold said mechanism in position to operatively engage with successive pipes.

4. The combination with a pipe cooling table having means for supporting heated pipes traversing the width of the cooling table and means for moving the pipes, of a plurality of pipe turning mechanisms located in the path of movement of said pipes and arranged to successively turn, through part of a revolution, the pipes brought into engagement therewith by said pipe moving means.

5. The combination with a pipe cooling table having means for supporting heated pipes traversing the width of the cooling table and means for moving the pipes, of a pipe turning mechanism located in the path of movement of the pipes, said pipe turning mechanism including a rotary star wheel arranged to automatically turn, through part of a revolution, successive pipes brought into engagement therewith by said pipe moving means.

6. The combination with a pipe cooling table having means for supporting heated pipes traversing the width of the cooling table and means for moving the pipes, of a pipe turning mechanism located in the path of movement of the pipes, said pipe turning mechanism including a plurality of alined rotary star wheels arranged to simultaneously engage with and turn, through part of a revolution, pipes brought into engagement therewith by said pipe moving means.

7. The combination with a pipe cooling table having means for supporting heated pipes traversing the width of the cooling table and means for moving pipes, of a pipe turning mechanism located in the path of movement of the pipes, said pipe turning mechanism including a series of sets of rotary star wheels arranged to turn, through part of a revolution, pipes brought into engagement therewith during movement of the pipes across the width of said cooling table.

8. The combination with a pipe cooling table having means for supporting heated pipes traversing the width of the cooling table and means for positively moving the pipes of a pipe turning mechanism located in the path of movement of the pipes, said pipe turning mechanism including a series of sets of rotary star wheels, and said sets of star wheels being arranged to turn, through part of a revolution, pipes brought into engagement with said turning mechanism during the movement of the pipes across said cooling table.

9. The combination with a pipe cooling table having means for supporting heated pipes traversing the width of the cooling table and means for positively moving the pipes of a pipe turning mechanism located in the path of movement of the pipes, said pipe turning mechanism including a series of rotary star wheels, said star wheels being arranged to turn, through part of a revolution, pipes brought into engagement with said turning mechanism during the movement of the pipes across said cooling table.

In testimony whereof I have hereunto set my hand.

JOSEPH J. DONNELLY.

Copies of this patent may be obtained for five cents each, by addressing the "Commissioner of Patents, Washington, D. C."